(12) United States Patent
Hayakawa et al.

(10) Patent No.: US 9,415,719 B2
(45) Date of Patent: Aug. 16, 2016

(54) HEADLIGHT CONTROL DEVICE

(71) Applicant: Fuji Jukogyo Kabushiki Kaisha, Tokyo (JP)

(72) Inventors: Kazuhiro Hayakawa, Tokyo (JP); Yuto Aoki, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 14/314,511

(22) Filed: Jun. 25, 2014

(65) Prior Publication Data

US 2015/0002015 A1 Jan. 1, 2015

(30) Foreign Application Priority Data

Jun. 26, 2013 (JP) ................. 2013-133750

(51) Int. Cl.
*B60Q 1/02* (2006.01)
*B60Q 1/14* (2006.01)
*B60Q 1/08* (2006.01)
*G06K 9/00* (2006.01)
*B60Q 1/00* (2006.01)
*B60Q 1/04* (2006.01)
*F21S 8/10* (2006.01)

(52) U.S. Cl.
CPC *B60Q 1/143* (2013.01); *B60Q 1/08* (2013.01); *B60Q 1/1423* (2013.01); *G06K 9/00825* (2013.01); *B60Q 1/0023* (2013.01); *B60Q 1/04* (2013.01); *B60Q 2300/054* (2013.01); *B60Q 2300/144* (2013.01); *B60Q 2300/314* (2013.01); *B60Q 2300/3321* (2013.01); *B60Q 2300/41* (2013.01); *B60Q 2300/42* (2013.01); *F21S 48/10* (2013.01); *F21S 48/1186* (2013.01)

(58) Field of Classification Search
CPC .... B60Q 1/1423; B60Q 1/143; B60Q 1/0023; B60Q 1/04; B60Q 2300/42; B60Q 2300/41; B60Q 2300/054; F21S 48/1186; F21S 48/10
See application file for complete search history.

(56) References Cited

U.S. PATENT DOCUMENTS 5,796,094 A * 8/1998 Schofield et al. .......... 250/208.1
9,019,090 B2 * 4/2015 Weller et al. ............... 340/425.5
(Continued)

FOREIGN PATENT DOCUMENTS

| JP | 3660877 | 6/2005 |
|---|---|---|
| JP | 2011-255826 | 12/2011 |
| WO | 00/17009 | 3/2000 |

*Primary Examiner* — Alexander H Taningco
*Assistant Examiner* — Christian L Garcia
(74) *Attorney, Agent, or Firm* — Troutman Sanders LLP

(57) ABSTRACT

A headlight control device automatically switches a light distribution pattern of a headlight for illumination ahead of a vehicle. The headlight control device including an imager that sequentially takes images of a view ahead of the vehicle in a predetermined frame rate, an another-vehicle recognizer that recognizes a light source of another vehicle from each of the images sequentially taken by the imager, a light distribution controller that switches the light distribution pattern according to a recognition result of the another-vehicle recognizer, and a signal provider that provides a signal to illumination light of the headlight by causing the luminance of the headlight to change in a predetermined cycle. The another-vehicle recognizer recognizes, as reflected light of the headlight of the vehicle, a light source which is present within the image and of which luminance change is substantially similar to a luminance change of the signal.

12 Claims, 4 Drawing Sheets

(56) References Cited

U.S. PATENT DOCUMENTS

| | | |
|---|---|---|
| 2002/0060522 A1 | 5/2002 | Stam et al. |
| 2002/0195949 A1 | 12/2002 | Stam et al. |
| 2004/0008110 A1 | 1/2004 | Stam et al. |
| 2005/0219852 A1 | 10/2005 | Stam et al. |
| 2008/0101077 A1* | 5/2008 | Watanabe ............ B60Q 1/1423 362/466 |
| 2014/0169010 A1* | 6/2014 | Imaeda ......................... 362/460 |
| 2014/0288763 A1* | 9/2014 | Bennett .................. B62D 11/18 701/31.6 |
| 2015/0149045 A1* | 5/2015 | Mizuno ................ B60Q 1/1423 701/49 |

\* cited by examiner

HEADLIGHT CONTROL DEVICE

CROSS-REFERENCE TO RELATED APPLICATIONS

The present application claims priority from Japanese Patent Application No. 2013-133750 filed on Jun. 26, 2013, the entire contents of which are hereby incorporated by reference.

BACKGROUND

1. Technical Field

The present invention relates to a headlight control device with which a situation ahead of a vehicle is detected and a light distribution pattern is automatically switched, and particularly relates to a headlight control device capable of identifying reflected light of a headlight of the vehicle from other light sources.

2. Related Art

A headlight of a vehicle such as an automobile is generally capable of switching between driving beam (high beam) and passing beam (low beam) or capable of turning off a driving beam independently from a passing beam.

In recent years, there have been proposals for a function (auto high beam function) of recognizing a situation ahead of a vehicle with a camera, radar, or the like to automatically switch from high beam to low beam in the case where a vehicle ahead such as an oncoming car or preceding for which glare may become a problem is detected.

As a conventional technique relating to such an auto high beam, Japanese Unexamined Patent Application Publication No. 2011-255826, for instance, discloses a vehicle headlight that performs switching between a light distribution pattern for high beam and a light distribution pattern for low beam upon detection of a vehicle ahead with an onboard camera or the like, such that a light distribution pattern for low beam is selected regardless of the presence or absence of detection of a vehicle ahead while driving through a sharp curve where an oncoming car may approach from outside an angle of view (a blind angle) of the camera or the like, so that glare for an oncoming car is prevented when an oncoming car detection is unsuccessful.

In the case of performing auto high beam control, it is important to identify a light source of a vehicle ahead with high precision.

As a conventional technique relating to such light source identification, Japanese Patent No. 3660877, for instance, discloses that whether a light source is a moving light source or a static light source is identified and reflected in auto high beam control.

Conventionally, there have been cases where light for illumination from a headlight of a vehicle that is reflected by a reflector provided near a road is falsely recognized as a light source of another vehicle upon identification of a light source.

In the case where such reflected light has been falsely recognized as a vehicle ahead and switching from high beam to low beam has been performed, the visibility for a driver of the vehicle is reduced.

When a light source of a vehicle ahead is falsely recognized as reflected light of the headlight of the vehicle, glare may be caused by direct illumination of the vehicle ahead with a high beam.

SUMMARY OF THE INVENTION

The present invention has been designed in consideration of the circumstances described above, and an object thereof is to provide a headlight control device capable of distinguishing reflected light of a headlight of a vehicle from other light sources.

A first aspect of the present invention provides a headlight control device that automatically switches a light distribution pattern of a headlight for illumination ahead of a vehicle, the headlight control device including an imager that sequentially takes images of a view ahead of the vehicle in a predetermined frame rate, an another-vehicle recognizer that recognizes a light source of another vehicle from each of the images sequentially taken by the imager, a light distribution controller that switches the light distribution pattern according to a recognition result of the another-vehicle recognizer, and a signal provider that provides a signal to illumination light of the headlight by causing the luminance of the headlight to change in a predetermined cycle. The another-vehicle recognizer recognizes, as reflected light of the headlight of the vehicle, a light source which is present within the image and of which luminance change is substantially similar to a luminance change of the signal.

A second aspect of the present invention provides a headlight control device that automatically switches a light distribution pattern of a headlight for illumination ahead of a vehicle, the headlight control device including an imager that sequentially takes images of a view ahead of the vehicle in a predetermined frame rate, an another-vehicle recognizer that recognizes a light source of another vehicle from each of the images sequentially taken by the imager, a light distribution controller that switches the light distribution pattern according to a recognition result of the another-vehicle recognizer, and a luminance changer to change the luminance of the headlight in a predetermined cycle. The another-vehicle recognizer recognizes, as reflected light of the headlight of the vehicle, a light source which is present within the image and of which luminance changes in a cycle substantially identical to a cycle of a luminance change of the headlight of the vehicle.

The light distribution controller may set the light distribution pattern of the headlight to light distribution for high beam in a case where the another-vehicle recognizer recognizes reflected light of the headlight of the vehicle and does not recognize a light source of another vehicle.

The light distribution controller may set the light distribution pattern of the headlight to light distribution for low beam in a case where the another-vehicle recognizer is unable to recognize reflected light of the headlight of the vehicle.

DETAILED DESCRIPTION

Example

An example of a headlight control device according to the present invention will be described below.

The headlight control device of the example is provided at the front of a body of an automobile such as, for instance, a passenger car to control a headlight for illumination of a predetermined region ahead of the vehicle.

Figure 1:
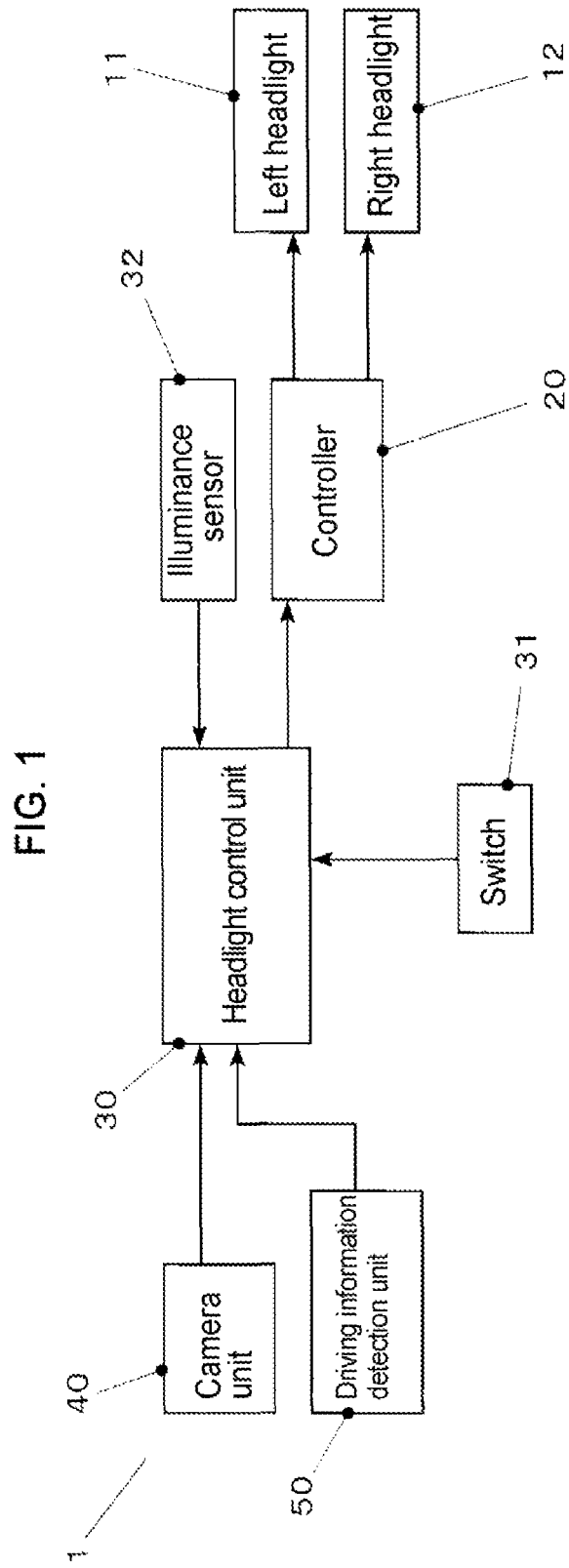
FIG. 1 is a block diagram illustrating the configuration in an example of a headlight control device according to the present invention.

FIG. 1 is a block diagram illustrating the configuration of the headlight control device of the example.

As illustrated in FIG. 1, a headlight control device 1 includes a left headlight 11, a right headlight 12, a controller 20, a headlight control unit 30, a camera unit 40, a driving information detection unit 50, and the like.

The left headlight 11 and the right headlight 12 are provided respectively on left and right at the front of the body.

For the left headlight 11 and the right headlight 12, high beam (driving beam) for illumination up to, for instance, 100 m or more ahead of the vehicle and low beam (passing beam) for illumination up to, for instance, approximately 40 m ahead of the vehicle are selectable.

The left headlight 11 and the right headlight 12 each include a light source capable of blinking at a high rate (e.g., at least 30 times per second) such as, for instance, an LED for high beam and for low beam, a projector-type or reflector-type optical system to project light generated by the light source in a predetermined light distribution pattern, and the like.

The light sources for high beam and for low beam are capable of being turned on and off independently. When a high beam is turned on, a low beam is turned on simultaneously.

The controller 20 supplies power supplied from a battery (not illustrated) to each light source of the left headlight 11 or the right headlight 12.

The controller 20 causes the light source for high beam and the light source for low beam of the left headlight 11 and the right headlight 12 to be each turned on or off according to a control signal from the headlight control unit 30.

The controller 20 is capable of providing illumination light with a signal for visible light communication by causing the left headlight 11 or the right headlight 12 to blink in a predetermined pattern at a high rate (e.g., 30 times or more per second).

The controller 20 is capable of generating a signal having any vehicle identification information by changing the on time and off time in a predetermined pattern (to accordingly change the frequency of blinks).

Such blinks are preferably performed with all of the left and right light sources for high beam and light sources for low beam in synchronization for ease of detection.

The headlight control unit 30 is an information processing device for an overall control of the headlight and accessories thereof.

The headlight control unit 30 includes an information processing device such as a CPU, a storage unit such as such as a RAM or ROM, an input-output interface, a bus for connection thereof, and the like.

The headlight control unit 30 has a function of providing a control signal to the controller 20 for switching among high beam lighting, low beam lighting, and off for the left headlight 11 and the right headlight 12.

The headlight control unit 30 is connected with a switch 31, an illuminance sensor 32, and the like.

The switch 31 is an operation input unit provided to, for instance, a steering column in the vehicle interior for operation of the headlight by a driver.

With the switch 31, it is possible to manually select off, low beam lighting, and high beam lighting or select auto mode.

In auto mode, whether it is light or the like outside the vehicle is detected to automatically turn the headlight on or off.

The auto mode further includes an auto high beam mode.

In auto high beam mode, the presence or absence of light (light source) of a vehicle ahead such as an oncoming car or preceding car, whether it is urban driving, or the like is determined based on a time-series image obtained through sequential imaging of a view ahead of the vehicle by the camera unit 40 to perform high beam lighting under normal conditions and automatically switch to low beam lighting in the case where a vehicle ahead is detected within a predetermined range or urban driving is detected.

The headlight control unit 30 functions as an another-vehicle recognizer to recognize a light source of other vehicles based on information from the camera unit 40 or the like and a light distribution controller to perform switching between high beam lighting and low beam lighting according to the recognition result.

The illuminance sensor 32 is a lightness sensor to detect the brightness outside the vehicle.

The illuminance sensor 32 is provided to, for instance, the vehicle interior at the periphery of a front windshield.

The camera unit 40 is, for instance, a monocular camera or stereo camera to image a view ahead of the vehicle.

The camera unit 40 sequentially images a range within a predetermined angle of view in a predetermined frame rate with a solid-state image sensor such as, for instance, a CMOS or CCD and provides obtained time-series image data sequentially to the headlight control unit 30.

The frame rate is set at a sufficiently high rate with respect to a blink cycle so that a signal (blink of the headlight) generated by the controller 20 can be detected appropriately.

The camera unit 40 is provided, for instance, beside a base of a rear-view mirror (upper end of the front windshield) in the vehicle interior.

The driving information detection unit 50 is connected to a speed sensor, a steering angle sensor, a horizontal acceleration sensor, a yaw-rate sensor, and the like (not illustrated).

Based on output of each of these units, the driving information detection unit 50 provides information relating to the state of the vehicle such as speed, steering angle (steering wheel angle), horizontal acceleration (horizontal G), yaw rate, or the like to the headlight control unit 30.

The driving information detection unit 50 provides information relating to whether forward or reverse is selected in a transmission of the vehicle, the transmission gear position (transmission gear ratio) in the case of forward, or the like to the headlight control unit 30.

The headlight control unit 30 performs auto high beam mode only in forward.

Next, light source recognition for auto high beam control in the headlight control device of the example will be described.

Figure 2:
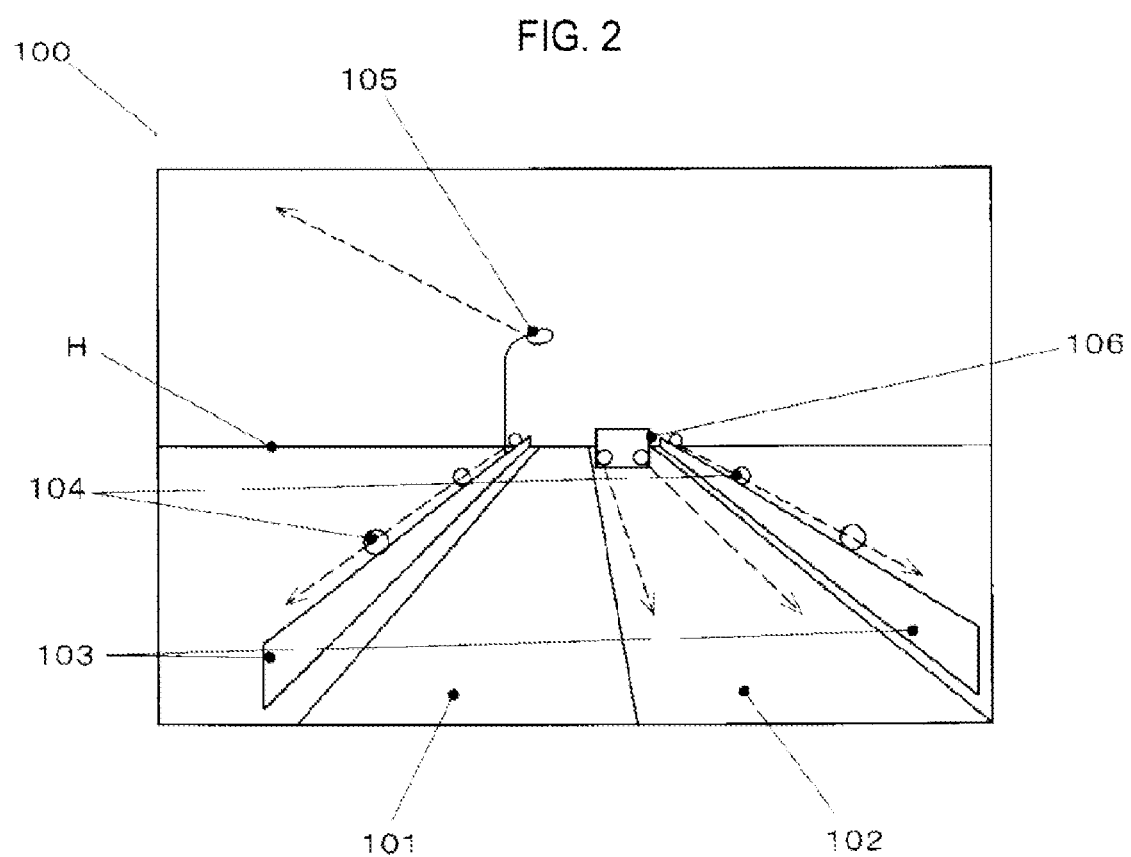
FIG. 2 is a schematic illustrating an instance of an image of a view ahead of a vehicle in the headlight control device of the example.

FIG. 2 is a schematic illustrating an instance of an image of a view ahead of the vehicle in the headlight control device of the example.

An image 100 includes pixel groups corresponding to, for instance, each of a driving lane 101, an oncoming lane 102, a guardrail 103, a reflector 104, a street lamp 105, an oncoming car 106, and the like.

In the image 100, a horizontal reference line H for image processing is provided.

In the case of nighttime, a pixel group corresponding to a light source is mainly detected in the image 100.

In the case where images 100 sequentially taken are compared in time series, displacements of light of the reflector 104 and the street lamp 105 on the left side of the vehicle are respectively toward the lower left direction and the upper left direction from the middle of the screen over time.

Displacement of light of the reflector 104 on the right side (oncoming lane side) of the vehicle is toward the lower right direction from the middle of the screen over time.

In contrast, the feature of a headlight of the oncoming car 106 is that the luminance is extremely large compared to other light sources and displacement is toward the lower right direction from the middle of the screen.

The headlight control unit 30 is capable of recognizing and detecting the oncoming car 106 based on such feature.

In the case where a high-luminance pixel group of red corresponding to a taillight on a driving lane ahead of the vehicle is detected, a preceding car is recognized.

Further, in the case where a predetermined reference or more of light sources such as the street lamp 105 other than a vehicle are distributed, it is determined as urban driving, and the headlight control unit 30 performs low beam lighting for both the left headlight 11 and the right headlight 12.

Illumination light of the left headlight 11 and the right headlight 12 of the vehicle that is reflected by the reflector 104 on the oncoming lane side is prone to false recognition as the headlight of the oncoming car 106, since luminance is relatively high in the taken image and displacement is toward the lower right direction from the middle of the screen.

If the reflector 104 is falsely recognized as the headlight of the oncoming car 106, switching to low beam is performed even though the situation allows for driving with high beam, and the visibility for a driver of the vehicle is reduced.

Thus, in this example, light source identification described below is performed.

Figure 3:
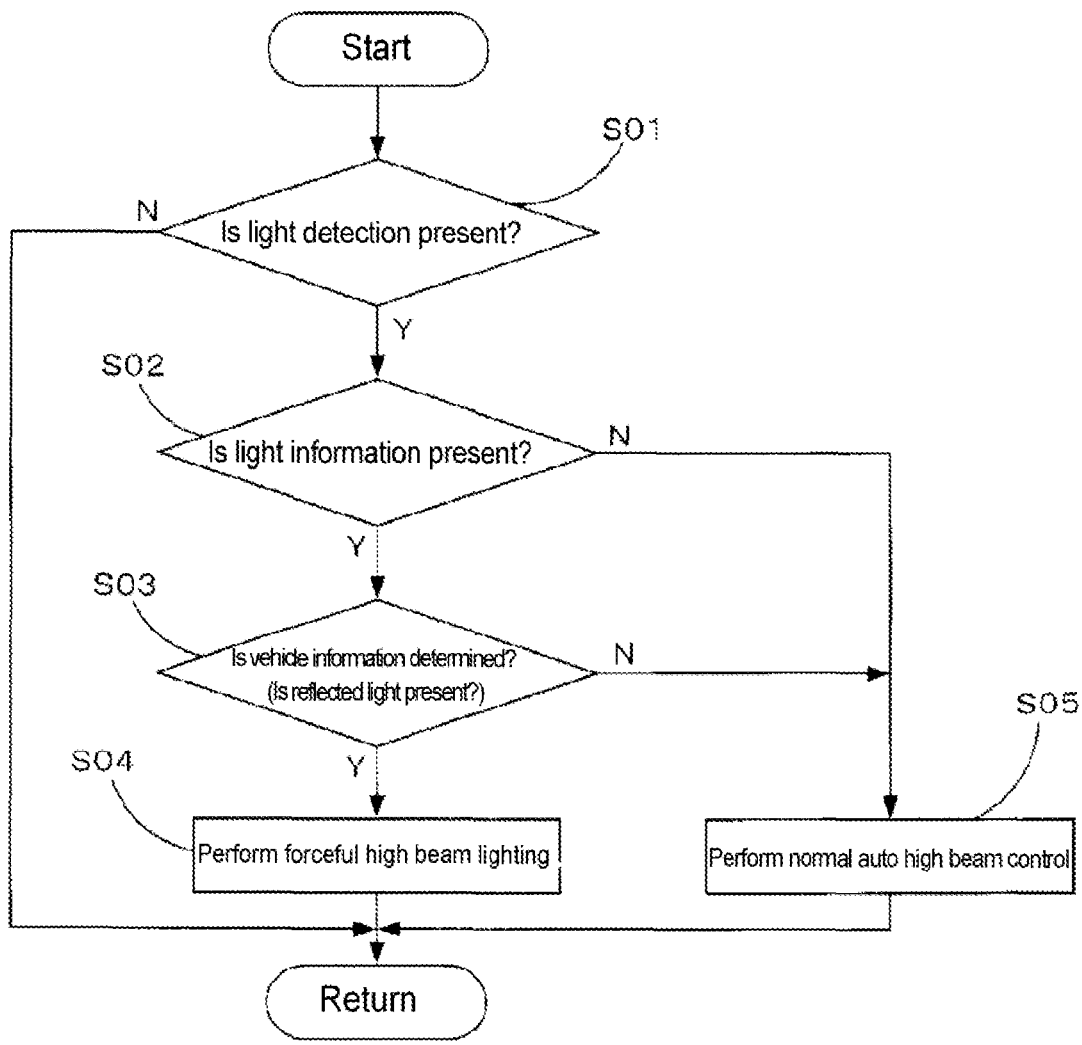
FIG. 3 is a flowchart illustrating light source identification control in the headlight control device of the example.

FIG. 3 is a flowchart illustrating light source identification control in the headlight control device of the example.

Each step will be described below in order.

<Step S01: Determining Presence or Absence of Light Detection>

The headlight control unit 30 determines whether or not there is a pixel group of a predetermined luminance or greater within an image taken by the camera unit 40.

In the case where a pixel group of the predetermined luminance or greater is present, it is assumed that light is detected, and step S02 is performed. Otherwise, the process is returned.

<Step S02: Determining Presence or Absence of Light Information>

The headlight control unit 30 monitors the luminance of light (high-luminance pixel group) detected in step S01 in time series and determines whether or not a luminance change (light information) of a predetermined pattern is present.

In the case where light information is present, step S03 is performed. In the case where light information is not present, step S05 is performed.

In the case where the surroundings are relatively bright due to environmental light such as, for instance, a street lamp and the presence or absence of light information cannot be determined, it is recognized as urban driving, the left headlight 11 and the right headlight 12 are both brought to a low beam lighting state, and the process is returned.

<Step S03: Vehicle Determination>

The headlight control unit 30 compares a luminance change pattern of light (high-luminance pixel group) detected in step S02 with a blink pattern of the left headlight 11 and the right headlight 12 of the vehicle generated by the controller 20. In the case of a substantial match, it is determined as reflected light of the headlight of the vehicle, and step S04 is performed.

In the case of a non-match, it is determined as light other than reflected light of the headlight of the vehicle, such as a light source of another vehicle, and step S05 is performed.

<Step S04: Turning on High Beam Forcefully>

The headlight control unit 30 outputs a control signal to the controller 20 and brings both the left headlight 11 and the right headlight 12 to a high beam lighting state.

Then, the process is returned.

<Step S05: Normal Auto High Beam Control>

In the case where a high-luminance pixel group having a feature corresponding to a vehicle ahead (oncoming car or preceding car) is detected within the image taken by the camera unit 40, the headlight control unit 30 brings both the left headlight 11 and the right headlight 12 to a low beam lighting state. Otherwise, normal auto high beam control for a high beam lighting state is performed.

Then, the process is returned.

Figure 4:
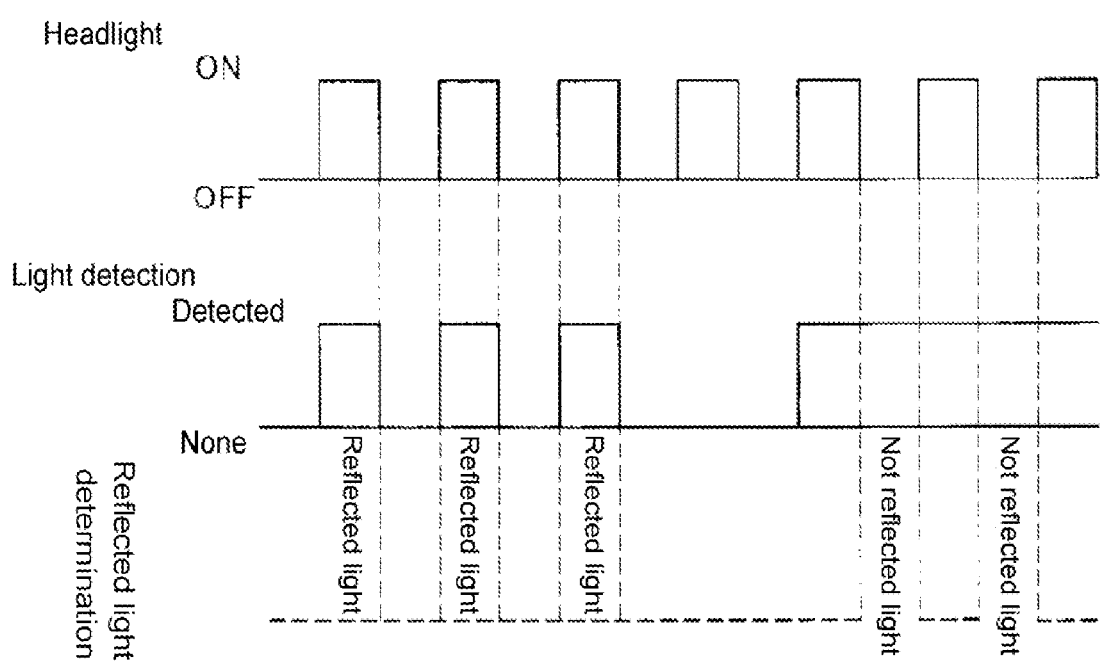
FIG. 4 is a schematic illustrating on or off of a headlight, luminance change in detected light, and the determination result for a light source at the time of light source identification in the headlight control device of the example.

FIG. 4 is a schematic illustrating on or off of the headlight, luminance change in detected light, and the determination result for a light source at the time of light source identification in the headlight control device of the example.

FIG. 4 illustrates, in order from the top, on or off of the light source for high beam and the light source for low beam of the left headlight 11 and the right headlight 12, presence or absence of light detection by the camera unit 40, and the reflected light determination result (light source identification result). The abscissa illustrates the time.

In the case where the light source of the headlight is caused to blink cyclically and the blink or luminance change of light detected by the camera unit 40 is substantially similar in pattern, the light is determined as reflected light of illumination light from the left headlight 11 or the right headlight 12 of the vehicle.

In the case where light detected by the camera unit 40 substantially does not show a luminance change regardless of the light source of the headlight being caused to blink cyclically, the light is determined as not reflected light of illumination light from the left headlight 11 or the right headlight 12 of the vehicle but as originating from a light source other than the vehicle such as a headlight of another vehicle.

With the example described above, the following effects can be obtained.

(1) By causing the left headlight 11 and the right headlight 12 of the vehicle to blink in a predetermined cycle to provide a signal to illumination light and recognizing reflected light of the headlight of the vehicle in the case where a light source detected by the camera unit 40 shows a substantially similar luminance change, the reflected light of the headlight of the vehicle can be identified with high precision to perform an appropriate auto high beam control.

By providing a signal to illumination light, reflected light of the headlight of the vehicle can be identified appropriately, even if a light source repeating a blink in a similar cycle is present other than the vehicle.

(2) With forceful high beam lighting in the case where only reflected light of the headlight of the vehicle is a recognized light source, visibility for a driver of the vehicle can be ensured.

(3) In the case where reflected light of the headlight of the vehicle is cannot be recognized, it is recognized as an environment (such as an urban area) where the surroundings are bright to some extent due to a street lamp, for instance, and light distribution for low beam is set, so that glare for others can be prevented.

Modified Example

The present invention is not limited to the example described above. Various modifications and changes are possible and within the technical scope of the present invention.

(1) The configuration of the headlight control device or the headlight is not limited to those of the example described above and may be changed appropriately.

For instance, although the auto high beam control performs switching between high beam and low beam in the example, this is not limiting. For instance, light distribution patterns for high beam may be switched according to the recognition result for a light source ahead with a headlight having a plurality of light distribution patterns for high beam.

(2) Although an LED light source is used as the light source of the headlight in the example, this is not limiting. The light source may be any type of light source, as long as blinking is possible at a high rate to an extent that a problem of flicker rarely arises upon visual contact with an illuminated region with the naked eye.

(3) In this example, a signal formed of blinks of a predetermined pattern is provided to illumination light of the headlight. However, identification of reflected light of the headlight of the vehicle is also possible without such a signal with varying blink cycles or the like by causing the headlight to blink periodically in a predetermined cycle, as long as other light sources that blink in the same cycle is not present. In this case, the configuration of a device to perform blink control can be simplified since a signal does not need to be provided.

(4) A high-luminance state and a low-luminance state may be switched cyclically, instead of causing the headlight to blink.

The invention claimed is:

1. A headlight control device that automatically switches a light distribution pattern of a headlight for illumination ahead of a vehicle, the headlight control device comprising:
   an imager that sequentially takes images of a view ahead of the vehicle in a predetermined frame rate;
   an another-vehicle recognizer that recognizes a light source of another vehicle from each of the images sequentially taken by the imager;
   a driving information detection unit detecting information relating to a state of the vehicle;
   a light distribution controller that switches the light distribution pattern according to a recognition result of the another-vehicle recognizer and the driving information detection unit; and
   a signal provider that provides a signal to illumination light of the headlight by causing the luminance of the headlight to change in a predetermined cycle,
   wherein when the another-vehicle recognizer recognizes, as reflected light of the headlight of the vehicle, a light source which is present within the image and of which luminance change is substantially similar to a luminance change of the signal, the light distribution controller sets the light distribution pattern of the headlight to light distribution for high beam,
   wherein when the another-vehicle recognizer is unable to recognize the presence or absence of reflected light of the headlight of the vehicle due to ambient light levels, the light distribution controller sets the light distribution pattern of the headlight to light distribution for low beam, and
   wherein when the another-vehicle recognizer recognizes a light source of another vehicle, the light distribution controller sets the light distribution pattern of the headlight to light distribution for low beam.

2. A headlight control device that automatically switches a light distribution pattern of a headlight for illumination ahead of a vehicle, the headlight control device comprising:
   an imager that sequentially takes images of a view ahead of the vehicle in a predetermined frame rate;
   an another-vehicle recognizer that recognizes a light source of another vehicle from each of the images sequentially taken by the imager;
   a light distribution controller that switches the light distribution pattern according to a recognition result of the another-vehicle recognizer; and
   a luminance changer to change the luminance of the headlight in a predetermined cycle,
   wherein when the another-vehicle recognizer recognizes, as reflected light of the headlight of the vehicle, a light source which is present within the image and of which luminance changes in a cycle substantially identical to a cycle of a luminance change of the headlight of the vehicle, the light distribution controller sets the light distribution pattern of the headlight to light distribution for high beam, and
   wherein when the another-vehicle recognizer is unable to recognize the presence or absence of reflected light of the headlight of the vehicle due to ambient light levels, the light distribution controller sets the light distribution pattern of the headlight to light distribution for low beam, and
   wherein when the another-vehicle recognizer recognizes a light source of another vehicle, the light distribution controller sets the light distribution pattern of the headlight to light distribution for low beam wherein the another vehicle recognizer can detect a taillight from a headlight.

3. The headlight control device according to claim 1, wherein the light distribution controller sets the light distribution pattern of the headlight to light distribution for high beam in a case where the another-vehicle recognizer recognizes reflected light of the headlight of the vehicle and does not recognize a light source of another vehicle.

4. The headlight control device according to claim 2, wherein the light distribution controller sets the light distribution pattern of the headlight to light distribution for high beam in a case where the another-vehicle recognizer recognizes reflected light of the headlight of the vehicle and does not recognize a light source of another vehicle.

5. The headlight control device according to claim 1, further comprising a driving information detection unit detecting information relating to a state of the vehicle,
   wherein the driving information detection unit comprises at least one of a speed sensor, a steering angle sensor, a horizontal acceleration sensor, and a yaw-rate sensor.

6. The headlight control device according to claim 5, wherein the driving information detection unit detects at least one of a vehicle speed, a vehicle steering angle, a vehicle steering wheel angle, a horizontal acceleration, a transmission gear position and a yaw rate.

7. The headlight control device according to claim 5, wherein the driving information detection unit detects a transmission gear position, and
   wherein the light distribution controller sets the light distribution pattern of the headlight to light distribution for high beam in a case where the transmission gear position is detected in a forward gear.

8. The headlight control device according to claim 2, wherein the another-vehicle recognizer can differentiate between a taillight and a headlight, and
   wherein the another-vehicle recognizer recognizes the taillight by detecting high-luminance red-pixels.

9. The headlight control device according to claim 1, further comprising a driving information detection unit detecting information relating to a state of the vehicle, wherein the driving information detection unit comprises at least one of a horizontal acceleration sensor and a yaw-rate sensor.

10. The headlight control device according to claim 9, wherein the driving information detection unit detects at least one of a horizontal acceleration and a way rate.

11. The headlight control device according to claim 1, wherein the another-vehicle recognizer only recognizes the light source from each of the images sequentially taken by the imager when a pixel group having a predetermined luminance or greater is present in the images.

12. The headlight control device according to claim 2, wherein the another-vehicle recognizer only recognizes the light source from each of the images sequentially taken by the imager when a pixel group having a predetermined luminance or greater is present in the images.

* * * * *